United States Patent [19]

Okitsu

[11] Patent Number: 4,701,483
[45] Date of Patent: Oct. 20, 1987

[54] LACTONE-MODIFIED HYDROXYETHYL (METH) ACRYLATE SOLUTION

[75] Inventor: Kiyoshi Okitsu, Hiroshima, Japan

[73] Assignee: Daicel Chemical Industries. Ltd., Osaka, Japan

[21] Appl. No.: 806,114

[22] Filed: Dec. 6, 1985

Related U.S. Application Data

[63] Continuation of Ser. No. 599,867, Apr. 13, 1984, abandoned.

[30] Foreign Application Priority Data

Apr. 13, 1983 [JP] Japan .................. 58-063632

[51] Int. Cl.⁴ .................. C08L 67/04; C08L 67/06
[52] U.S. Cl. .................. 523/500; 523/511; 528/354; 525/412; 525/415; 525/921
[58] Field of Search .................. 523/511, 522, 500; 525/412, 415, 921; 528/354

[56] References Cited

U.S. PATENT DOCUMENTS

| | | | |
|---|---|---|---|
| 3,651,021 | 3/1972 | Kincaid | 525/415 |
| 3,655,631 | 4/1972 | Fraser | 528/356 |
| 3,760,334 | 9/1973 | Critchfield | 523/522 |
| 4,048,036 | 9/1977 | Prucnal | 204/159.23 |
| 4,368,320 | 1/1983 | Aldinger | 528/354 |

Primary Examiner—Patricia A. Short
Attorney, Agent, or Firm—Sughrue, Mion, Zinn, Macpeak & Seas

[57] ABSTRACT

A lactone-modified hydroxyethyl (meth)acrylate solution comprising 30 to 95 parts by weight of a lactone-modified hydroxyethyl (meth)acrylate represented by the formula (I):

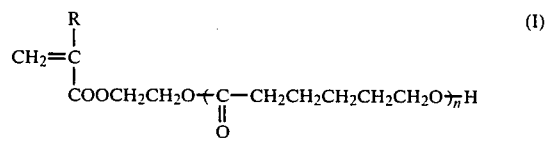

wherein R is $CH_3$ or H, and n is an integer of from 3 to 20, and 5 to 70 parts by weight of a solvent selected from the group consisting of toluene, xylene, an acetic acid ester and a mixture thereof is disclosed. The solution of the invention is homogeneous at room temperature.

8 Claims, No Drawings

LACTONE-MODIFIED HYDROXYETHYL (METH) ACRYLATE SOLUTION

This is a continuation of application Ser. No. 599,867 filed Apr. 13, 1984, now abandoned.

FIELD OF THE INVENTION

This invention relates to a lactone-modified hydroxyethyl (meth)acrylate solution which is a homogeneous solution.

BACKGROUND OF THE INVENTION

Lactone-modified hydroxyethyl (meth)acrylates represented by the following formula (I):

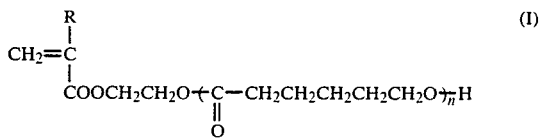

wherein R is $CH_3$ or H, and n is an integer of from 3 to 20,
are useful as a part of acrylic monomers for paints. But when they are standed for a long period of time (e.g., one to three days) at about 20° C., the high molecular weight moiety thereof becomes a paste-like state, and therefore, when used, they must be heated at, for example, 40° to 50° C. for homogenization.

The inventor extensively studied to overcome such drawback and reviewed various solvents for the lactone-modified hydroxyethyl (meth)acrylate of the formula (I) to improve the workability. Thus, he attained the invention.

SUMMARY OF THE INVENTION

An object of this invention is to provide a lactone-modified hydroxyethyl (meth)acrylate solution comprising 30 to 95 parts by weight of a lactone-modified hydroxyethyl (meth)acrylate represented by the formula (I):

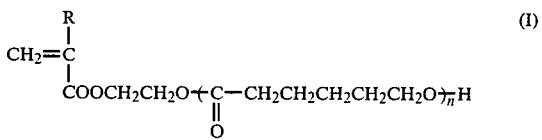

wherein R is $CH_3$ or H, and n is an integer of from 3 to 20,
and 5 to 70 parts by weight of a solvent selected from the group consisting of toluene, xylene, an acetic acid ester and a mixture thereof.

DETAILED DESCRIPTION OF THE INVENTION

The lactone-modified hydroxyethyl (meth)acrylate of the formula (I) used in this invention can be obtained by addition polymerization of ε-caprolactone to hydroxyethyl (meth)acrylate in the presence of a ring-opening polymerization catalyst.

Examples of the ring-opening polymerization catalyst which can be used are those exemplified below.

In case of the ring-opening polymerization of ε-caprolactone on hydroxyethyl (meth)acrylate, the ring-opening polymerization can be carried out at a temperature of from 130° to 230° C. by the addition of a catalyst such as a titanium catalyst (e.g., tetrabutyl titanate, tetraethyl titanate, tetrapropyl titanate, etc.) or an organic tin catalyst (e.g., dibutyltin laurate, dibutyltin oxide, tin octylate, etc.) Further, in case of the ring-opening polymerization of ε-caprolactone on hydroxyethyl (meth)acrylate using as the catalyst a stannous halide (including chlorides, iodides and bromides but excluding fluorides), the reaction can be carried out at a relatively low temperature of 80° to 130° C. with a relatively small amount of the catalyst because the stannous halide has strong catalytic activity.

Examples of the solvent which can be used include toluene, xylene, acetic acid exters (e.g., ethyl acetate, butyl acetate (BAc), etc.) and mixtures thereof. A suitable weight ratio of the lactone-modified hydroxyethyl (meth)acrylate to the solvent is in the range of from 30:70 to 95:5, preferably from 50:50 to 80:20, more preferably 60:40 to 80:20.

Since the solution of this invention is homogeneous at room temperature (e.g., about 20° to 30° C.), it can be used for various applications. Especially, even though the solution becomes partially heterogeneous at low temperatures in the winter season, since it can easily become homogeneous at about 20° to 30° C., which results in enabling one to proceed a subsequent operation without any difficulty.

The solution of this invention can provide acrylic polyol resins having excellent reactivity with a cross-linking agent and flexibility, upon copolymerization with other radical polymerizable monomers. Further, the solution of this invention can provide photo-curable oligomers having excellent flexibility, upon reaction with isocyanate compounds.

This invention is explained in more detail by reference to the following examples, but it is not to be construed that the invention is limited thereto.

EXAMPLES 1 AND 2

To hydroxyethyl methacrylate was added ε-caprolactone and ring-opening polymerization was carried out in the presence of stannous chloride as a ring-opening polymerization catalyst to obtain lactone-modified hydroxyethyl methacrylates having the integer n of 3 (Table 1) and 5 (Table 2). Each of the lactone-modified hydroxyethyl methacrylates was blended with a solvent as described in Table 1 or 2 to prepare a solution of lactone-modified hydroxyethyl methacrylate. Then, the solution thus prepared was examined. The results are shown in Tables 1 and 2.

TABLE 1

| Solids Content (wt %) | Solvent | | | | |
|---|---|---|---|---|---|
| | Toluene | | | Xylene | Toluene/BAc = 50/50 |
| | Temperature (°C.) | | | | |
| | 25 | 4* | −5** | 25 | 25 |
| 95 | O 96 CP/ 25° C. | X (30) | X (40) | O 95 CP/ 25° C. | O 99 CP/25° C. |
| 90 | O | Δ~X (15) | X (25) | O | O |
| 85 | O 46 CP/ 25° C. | Δ (10) | Δ~X (15) | O 49 CP/ 25° C. | O 40 CP/25° C. |
| 80 | O | O | Δ~X (10) | O | O |
| 75 | O | O | Δ (5) | O 25 CP/ 25° C. | O |
| 70 | O | O | O | O | O |

TABLE 1-continued

| Solids Content (wt %) | Solvent | | | | |
|---|---|---|---|---|---|
| | Toluene | | | Xylene | Toluene/BAc = 50/50 |
| | Temperature (°C.) | | | | |
| | 25 | 4* | −5** | 25 | 25 |
| 65 | O | O | O | O | O |

*The figure shown in the parenthesis means a time (min) required for that after the incubation for 4 days at 4° C., the solution was standed at room temperature (25° C.) and became not cloudy but homogeneous.
**Same as the meaning for * above except that the incubation temperature was −5° C.

TABLE 2

| Solids Content (wt %) | Solvent | | |
|---|---|---|---|
| | Toluene | Xylene | Toluene/BAc = 50/50 |
| | Temperature (°C.) | | |
| | 25 | 25 | 25 |
| 80 | O | O | O |
| | 53 CP/25° C. | 56 CP/25° C. | 55 CP/25° C. |
| 75 | O | O | O |
| 70 | O | O | O |
| | 22 CP/25° C. | 28 CP/25° C. | 24 CP/25° C. |
| 65 | O | O | O |
| 60 | O | O | O |

The criteria used in Tables 1 and 2 are as follows:
O: not cloudy
O ~ Δ: slightly cloudy
Δ: fairly cloudy
Δ~X: cloudy (with fluidity)
X: cloudy (with substantially no fluidity)

While the invention has been described in detail and with reference to specific embodiments thereof, it will be apparent to one skilled in the art that various changes and modifications can be made therein without departing from the spirit and scope thereof.

What is claimed is:

1. A lactone-modified hydroxyethyl (meth)acrylate solution homogeneous at room temperature consisting of 30 to 95 parts by weight of a lactone-modified hydroxyethyl (meth)acrylate represented by the formula (I):

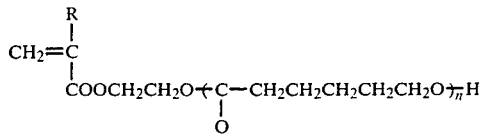

wherein R is $CH_3$ or H, and n is an integer of from 3 to 20 and 5 to 70 parts by weight of a solvent selected from the group consisting of toluene, xylene, and a mixture thereof.

2. The lactone-modified hydroxyethyl (meth)acrylate solution of claim 1, consisting of 50 to 80 parts by weight of the lactone-modified hydroxyethyl (meth)acrylate and 20 to 50 parts of the solvent.

3. The lactone-modified hydroxyethyl (meth)acrylate solution of claim 1, consisting of 60 to 80 parts by weight of the lactone-modified hydroxyethyl (meth)acrylate and 40 to 20 parts of the solvent.

4. The lactone-modified hydroxyethyl (meth)acrylate solution of claim 1, wherein the solvent is toluene.

5. The lactone-modified hydroxyethyl (meth)acrylate solution of claim 1, wherein the solvent is xylene.

6. A method of forming a homogeneous lactone-modified hydroxyethyl (meth)acrylate which comprises adding to 30 to 95 parts by weight of a lactone-modified hydroxyethyl (meth)acrylate represented by the formula (I):

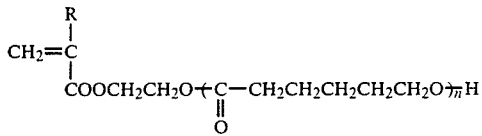

wherein R is $CH_3$ or H, and n is an integer of from 3 to 20, from 5 to 70 parts by weight of a solvent selected from the group consisting of toluene, xylene, and a mixture thereof, to thereby form a solution consisting of the lactone-modified hydroxyethyl (meth)acrylate and the solvent.

7. The method of claim 6, wherein the lactone-modified hydroxyethyl (meth)acrylate solution consists of 50 to 80 parts by weight of the lactone-modified hydroxyethyl (meth)acrylate and 20 to 50 parts of the solvent.

8. The method of claim 6, wherein the lactone-modified hydroxyethyl (meth)acrylate solution consists of 60 to 80 parts by weight of the lactone-modified hydroxyethyl (meth)acrylate and 40 to 20 parts of the solvent.

* * * * *